Patented June 24, 1924.

1,499,001

UNITED STATES PATENT OFFICE.

CARNIE B. CARTER AND ALBERT E. COXE, OF PITTSBURGH, PENNSYLVANIA, ASSIGNORS TO S. KARPEN & BROS., OF CHICAGO, ILLINOIS, A CORPORATION OF WEST VIRGINIA.

PROCESS OF PRODUCING HEXAMETHYLENETETRAMINE.

No Drawing.     Application filed August 23, 1922. Serial No. 583,915.

*To all whom it may concern:*

Be it known that we, CARNIE B. CARTER and ALBERT E. COXE, citizens of the United States, residing at Pittsburgh, Allegheny County, Pennsylvania, have invented a new and useful Improvement in Processes of Producing Hexamethylenetetramine, of which the following is a specification.

The present invention relates to the production of hexamethylenetetramine; and the primary object is to provide a simple and practicable method of producing hexamethylenetetramine by condensing methylene chloride with ammonia.

Methylene chloride is obtained as one of the chlorinated products when natural gas, for example, is subjected to a chlorination process for the purpose of producing methyl chloride to be used in the production of esters, as described in our pending application No. 423,870, filed November 13, 1920.

The present method provides a use for such methylene chloride as is formed in the chlorination of the natural gas. According to this method, hexamethylenetetramine, which is widely used in the arts, may be easily and conveniently produced in very pure form.

Methylene chloride enters into reaction with liquid ammonia to produce ammonium chloride and hexamethylenetetramine, at temperatures as low as 20° to 25° C. The reaction may be represented by the following equation:

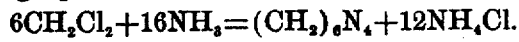

$$6CH_2Cl_2 + 16NH_3 = (CH_2)_6N_4 + 12NH_4Cl.$$

The course of the reaction may be shown in a general way by the following simple qualitative experiment. Mix methylene chloride and liquid ammonia in substantially equal volumes in a heavy wall glass tube and hermetically seal the tube. Ammonia is a gas under normal conditions of temperature and pressure and condenses to a liquid under atmospheric pressures at a temperature of −38.5° C. It is necessary, therefore, in preparing the tube for experiment as described above that the tube shall dip into a cold bath while being partially filled with liquid ammonia and that it shall be hermetically sealed before removal from this bath. A bath of carbon dioxide snow and alcohol is suitable for the purpose.

The tube thus prepared at first shows a perfectly homogeneous liquid; the methylene chloride and liquid ammonia are miscible in all proportions. After standing for a few hours (8–12) at room temperatures, however, the liquid begins to separate into two layers, the smaller layer forming at the top. As time goes on the upper layer gradually grows larger and after ten days or two weeks the two layers have become about equal in volume. At this point crystals begin to sparate from the liquids, the liquids begin at the same time to disappear, and as crystallization proceeds the two liquids gradually disappear until the liquids are finally supplanted by a crystalline mass. Such an experiment extends over a period of several weeks.

The mass of crystals on examination will be found to be a mixture of ammonium chloride and hexamethylenetetramine in the proportions of one mol. of hexamethylenetetramine to twelve mols. of ammonium chloride. The separation of the two constituents may be effected as follows: The entire mass is carefully and thoroughly extracted with chloroform in order to dissolve all hexamethylenetetramine; the ammonium chloride is not dissolved. Quantitative analyses of the chloroform solution and the residual crystalline mass will show that hexamethylenetetramine and ammonium chloride are present in the proportion of 1 mol. of hexamethylenetetramine to twelve mols. of ammonium chloride.

The time required for a complete reaction between methylene chloride and ammonia at room temperature makes the reaction at such temperature impracticable from a manufacturing point of view. A temperature of 75° C. is quite satisfactory, although a somewhat higher temperature may be used if desired. At a temperature of 100° C., the conversion is roughly proportionate to the time of the heating operation. For example, a mixture of the materials heated at a temperature of 100° C. for 5 hours shows a conversion of about 35.6 per cent; heated for 10 hours, shows a conversion of about 81.2 per cent; and heated for twenty hours, shows a conversion of substantially 100 per cent. The reaction may be carried out practically in somewhat less than 20 hours at 100° C. The time may be very much shortened by carrying out the reaction at a temperature of 120° C. to 125° C. The critical temperature of ammonia is 130° C. and a temperature somewhat lower than this figure probably is desirable.

In practice, the manufacture of hexamethylenetetramine by this method may be carried out in the following way:

A given quantity of methylene chloride is placed in a strong metal autoclave; liquid ammonia is then pumped into the autoclave until sufficient ammonia has been introduced to combine with all of the methylene chloride to form hexamethylenetetramine and ammonium chloride. The theoretical proportions are 6 mols. of methylene chloride to 16 mols. of ammonia. In practice, an excess of ammonia may be used, say 100 per cent excess. The autoclave is heated at 100° C. or higher for a period of 20 hours or less, depending on the temperature employed. Excess ammonia is distilled off and recovered. The residual crystal mass is subjected to extraction with chloroform, carbon tetrachloride, or other suitable solvent, in any suitable extractor, to separate the hexamethylenetetramine from the ammonium chloride. The hexamethylenetetramine thus obtained is of high purity, if pure ammonia and pure methylene chloride have been employed, and requires no purification.

The ammonium chloride is treated with hydrated lime and subjected to distillation in order to recover the ammonia. The recovered ammonia is subsequently used in the formation of more hexamethylenetetramine.

From the description given it will be seen that only four of the 16 parts of ammonia used in the autoclave are actually consumed to form hexamethylenetetramine. The remaining 12 parts of ammonia react to form ammonium chloride and this amonia is recoverable by the method stated.

The methylene chloride is employed as a liquid in the process; and, as stated, liquid ammonia preferably is employed.

In practice, the materials are expelled from the autoclave and the excess of ammonia, where used, is withdrawn from the storage tank and compressed to form liquid ammonia and returned to the liquid ammonia tank to be reused. Also, the ammonia recovered by treating ammonium chloride with hydrated lime in a still is returned to the liquid ammonia storage tank to be reused.

As indicated, the hexamethylenetetramine is extracted from the mixture of hexamethylenetetramine and ammonium chloride by passing chloroform through the extracting chamber. The chloroform carrying the dissolved hexamethylenetetramine passes to a still by means of which the chloroform is driven off and the hexamethylenetetramine is recovered. The chloroform in the still passes back to the chloroform storage tank and from there passes again to the extractor, and thus is used over and over in the process.

The foregoing detailed description has been given for clearness of understanding only and no unnecessary limitations should be understood therefrom, but the appended claims should be construed as broadly as permissible in view of the prior art.

What we regard as new and desire to secure by Letters Patent is—

1. The process of producing hexamethylenetetramine which comprises: reacting upon methylene chloride with ammonia at elevated temperature, in the absence of alcohol, to form hexamethylenetetramine and ammonium chloride and extracting the hexamethylenetetramine from the ammonium chloride.

2. The process of producing hexamethylenetetramine which comprises: causing a reaction at elevated temperature between methylene chloride and ammonia in the presence of an excess of ammonia, which excess amounts to more than 50% of the theoretical proportion, recovering the excess of ammonia, and extracting the hexamethylenetetramine formed from the ammonium chloride formed.

3. The process of producing hexamethylenetetramine which comprises: causing a reaction at elevated temperature between methylene chloride and ammonia in the presence of an excess of ammonia, such excess amounting to more than 50% of the theoretical proportion, recovering the excess of ammonia, extracting the hexamethylenetetramine formed from the ammonium chloride formed, recovering the excess ammonia and the ammonia from the ammonium chloride and reusing the recovered ammonia in treating a fresh supply of methylene chloride.

4. The process of producing hexamethylenetetramine which comprises: heating a mixture comprising methylene chloride and liquid ammonia, under pressure, and separating the hexamethylenetetramine formed from the ammonium chloride formed.

5. The process of producing hexamethylenetetramine which comprises: heating a mixture of methylene chloride and liquid ammonia in a closed vessel, the ammonia being present at least in sufficient quantity to combine with substantially all of the chlorine and the methylene groups of the methylene chloride.

6. The process of producing hexamethylenetetramine which comprises: heating a mixture of methylene chloride and liquid ammonia in a closed vessel, the ammonia being present in excess of the molecular proportions.

7. The process of producing hexamethylenetetramine which comprises: heating methylene chloride and liquid ammonia, under pressure, the ammonia being present in at least sufficient quantity to combine with substantially all of the chlorine and methylene groups of the methylene chloride; and extracting the hexamethylenetetramine from the by-product formed.

CARNIE B. CARTER.
ALBERT E. COXE.